United States Patent
Barratt et al.

(10) Patent No.: US 9,288,322 B2
(45) Date of Patent: Mar. 15, 2016

(54) CALL CENTER SYSTEM WITH REDUNDANT COMPONENTS AND METHOD OF OPERATION THEREOF

(75) Inventors: Nicholas Jerome Barratt, Bridgeman Downs (AU); William M. Stevens, Kirkland, WA (US)

(73) Assignee: Zetron, Inc., Redmond, WA (US)

( * ) Notice: Subject to any disclaimer, the term of this patent is extended or adjusted under 35 U.S.C. 154(b) by 234 days.

(21) Appl. No.: 13/448,908

(22) Filed: Apr. 17, 2012

(65) Prior Publication Data

US 2012/0263289 A1    Oct. 18, 2012

Related U.S. Application Data

(60) Provisional application No. 61/476,748, filed on Apr. 18, 2011.

(51) Int. Cl.
*H04M 3/00* (2006.01)
*G01R 31/08* (2006.01)
*G06F 11/00* (2006.01)
*H04J 1/16* (2006.01)
*H04L 12/26* (2006.01)
*H04M 5/00* (2006.01)
*H04M 3/51* (2006.01)

(52) U.S. Cl.
CPC .......... *H04M 3/5116* (2013.01); *H04M 3/5133* (2013.01); *H04M 2203/406* (2013.01); *H04M 2207/20* (2013.01)

(58) Field of Classification Search
CPC ........................ G06F 11/1658; G06F 11/2007
USPC ...................... 379/265.02; 370/216, 349, 228
See application file for complete search history.

(56) References Cited

U.S. PATENT DOCUMENTS

| | | | |
|---|---|---|---|
| 4,780,869 A | 10/1988 | Engdahl et al. | |
| 5,835,483 A * | 11/1998 | Bisson | 370/228 |
| 6,628,615 B1 * | 9/2003 | Joseph et al. | 370/231 |
| 6,631,398 B1 * | 10/2003 | Klein | 709/206 |
| 6,744,858 B1 | 6/2004 | Ryan et al. | |
| 7,305,069 B1 * | 12/2007 | Day | 379/88.13 |
| 2004/0165525 A1 * | 8/2004 | Burak | 370/228 |
| 2007/0183323 A1 * | 8/2007 | Hannu et al. | 370/230 |
| 2008/0068985 A1 | 3/2008 | Mieno | |
| 2010/0195508 A1 | 8/2010 | Ling et al. | |
| 2012/0030769 A1 * | 2/2012 | De Laet | 726/26 |

* cited by examiner

*Primary Examiner* — Nafiz E Hoque
(74) *Attorney, Agent, or Firm* — Ishimaru & Associates LLP (57) ABSTRACT

A method of operation of a call center system includes: providing an operator console having a first interface port and a second interface port; communicating with a local controller, having a primary interface port and a secondary interface port, by the operator console; establishing a redundant communication mode between the operator console and the local controller; and transmitting redundant messages between the operator console and the local controller including transmitting transmission headers having identical content on the first interface port and the second interface port.

20 Claims, 8 Drawing Sheets

CALL CENTER SYSTEM WITH REDUNDANT COMPONENTS AND METHOD OF OPERATION THEREOF

CROSS-REFERENCE TO RELATED APPLICATION(S)

This application claims the benefit of U.S. Provisional Patent Application Ser. No. 61/476,748 filed Apr. 18, 2011, and the subject matter thereof is incorporated herein by reference thereto.

TECHNICAL FIELD

The present invention relates generally to a call center system, and more particularly to a system for managing a volume of telephone calls that require immediate response.

BACKGROUND ART

Centrally located call processing centers, or call centers, are a key part of service response processes. The level of technology integration and sophistication in portable phones has risen to the point where cell phones now incorporate digital cameras, voice annotation, email, calendaring, and appointment functions in a single package.

In some settings, however, technology has not had such a dramatic impact. For example, an emergency call center (e.g., a 911 call center) typically has limited technological resources that it can draw upon to handle emergency calls. Some call centers may only include a telephone interface to handle incoming calls, a radio dispatch interface to alert the relevant authorities, and a call routing system to direct incoming calls to the appropriate operators. As another example, an appliance maintenance hotline may include a telephone interface to handle incoming calls, a technician that responds to the telephone calls, and a pre-generated service manual stored on a local machine that the technician may consult while handling the call.

In the example of an emergency call center, the communication flow may literally be a matter of life and death. The accurate delivery of information, recording the information and invoking an emergency response must be failsafe. A component failure at an inopportune time could cost a life. Since electronic components have a limited life span as well, accommodations must be made to assure that a failed cable does not cost a human life.

Thus, a need still remains for a call center system with redundant communication. In view of the increased reliance on telephone activated services, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a call center system including: providing an operator console having a first interface port and a second interface port; communicating with a local controller, having a primary interface port and a secondary interface port, by the operator console; establishing a redundant communication mode between the operator console and the local controller; and transmitting redundant messages between the operator console and the local controller including transmitting transmission headers having identical content on the first interface port and the second interface port.

The present invention provides a call center system, including: an operator console having a first interface port and a second interface port; and a local controller, having a primary interface port and a secondary interface port, for establishing a redundant communication mode between the operator console and the local controller.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The same numbers are used in all the drawing FIGs. to relate to the same elements. The embodiments have been numbered first embodiment, second embodiment, etc. as a matter of descriptive convenience and are not intended to have any other significance or provide limitations for the present invention.

The term "module" referred to herein can include software, hardware, or a combination thereof in the present invention in the context as used herein. For example, the software can be machine code, firmware, embedded code, and application software. Also for example, the hardware can be circuitry, processor, computer, integrated circuit, integrated circuit cores, a pressure sensor, an inertial sensor, a micro-electromechanical system (MEMS), passive devices, or a combination thereof.

When an emergency alert is received by the call center system it generates contextual awareness that is propagated to all associated system elements whose association type has an interest in emergency alerts. Each of the system elements integrates the emergency alert context into its current visual representation and control display. Associated data elements of interest or use during an alert may also be integrated into the element's interface.

As an example, a police officer in the field can press the emergency alert button on his mobile radio. In response, the emergency alert can be displayed on the control display of the receiving fixed station. The identity of the operator of the mobile radio is determined and the emergency alert indication is added to the control display indicated as a radio situation. The police officer's personal contact card is updated with an outstanding emergency alert condition.

Associated with emergency alert the control interface is updated with, the identification of the officer, the officer's partner, their assigned patrol car, and patrol route. This information helps form the contextual awareness of the emergency alert. Since the most likely response to an emergency alert is to acknowledge it and send backup or to clear a false alarm, the contextual workflow can update the control options to allow for immediate access to these options. In addition the behavior of some of the existing operations, such as a directed instant transmit, can be modified by the contextual workflow to provide an intuitive integration with the emergency alert.

Figure 1:
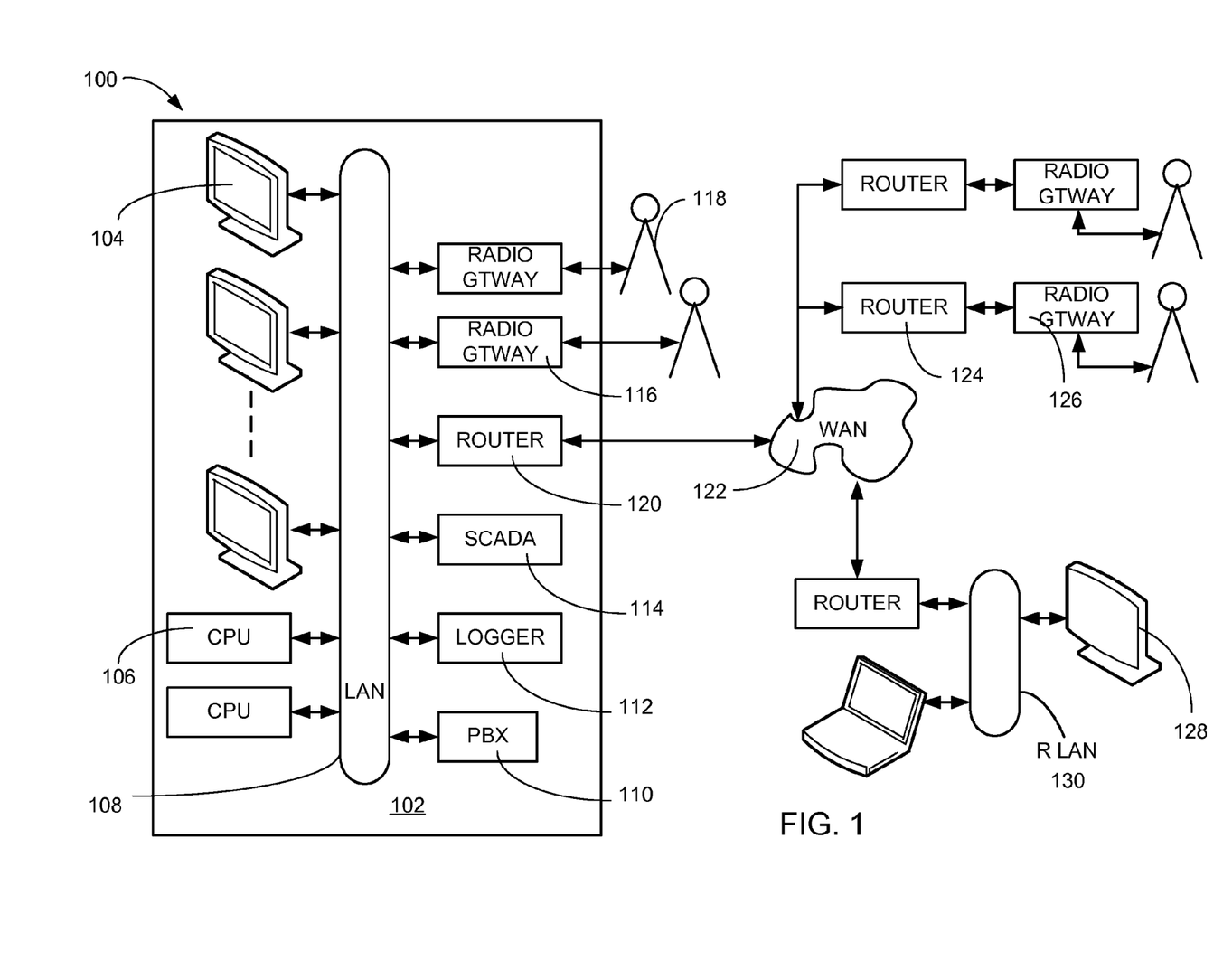
FIG. 1 is a functional block diagram of a call center system in an embodiment of the present invention.

Referring now to FIG. 1, therein is shown a functional block diagram of a call center system 100 in an embodiment of the present invention. The functional block diagram of the call center system 100 depicts a call center 102 having several units of an operator console 104, each having at least two ports, coupled to a central processing unit 106 through a network 108. The central processing unit 106 can be part of a redundant pair of the central processing unit 106. The central processing unit 106 can maintain a local data base of external resources or call history (not shown). The network 108 must be a reliable communication path since it provides a central link to the operations of the call center 102.

An operational premise of the call center system 100 provides that information is not presented or actionable until a context or choice makes it relevant. The generation of contextual awareness by processing contextual data is reflected in the implementation by both what is presented on the operator console 104 and what remains out of view but is still accessible by the operator through a configuration process.

A method for providing contextual workflow, within the call system 100, provides that an operator, co-located with a operator console 104, can be presented with associated interactive data elements and operational actions as determined by the comparison of a multi-layered association graph displayed on the operator console 104 representing both the static and dynamic relationships between data elements within an operational context.

The call center system 100 employs a call distribution engine that is integrated with a configurable interactive voice response (IVR) system that can be executed on the central processing unit 106. Additionally, configuration tools allow each public safety access point (PSAP) or the call center 102 to tailor the call routing and IVR behaviors on the central processing unit 106 of each site to meet the business needs, whether that involves saving lives or scheduling airlines.

The network 108 can also be coupled to a call exchange mechanism 110, such as a SIP gateway or FXO gateway, which is an electronic device that provides telephone and radio access to the resources of the call center 102. The telephone access can include analog, voice over internet protocol (VoIP), optical cable communication, or cellular. The logger 112, is a call recording mechanism, can be used to record all aspects of transactions between the operator console 104 and the call exchange mechanism 110 for later analysis.

The operator console 104 can have multiple ports for accessing primary and back-up paths in the network 108. A supervisory control and data acquisition (SCADA) unit 114 can be used to monitor the performance and utilization of the resources in the call center 102. The supervisory control and data acquisition unit 114 provides predictive analysis of the performance of all elements in the call center 102 and may keep track of any equipment accesses to back-up resources, such as a primary and an alternate Ethernet controller in the operator console 104 for providing a first interface port (not shown) and a second interface port (not shown).

A communication gateway 116, such as a radio gateway, can be coupled to the operator console 104 through the network 108. The operator console 104 can utilize the communication gateway 116 to drive a transceiver 118 in order to communicate with external resources (not shown). The call center 102 maintains multiple units of the communication gateway 116, which can be accessed through redundant paths (not shown) in the network 108. A local router 120, coupled to the network 108, can provide access to a wide area network (WAN) 122. The wide area network 122 can extend over expansive regions while the network 108 only exists within the call center 102. The wide area network 122 provides access through a remote router 124 to a remote radio gateway 126 or a remote operator console 128 coupled to a remote local area network 130.

It is understood that the depiction of the local router 120 having a single access to the wide area network 122 is an example only and redundant versions of the local router 120 and multiple access points to the WAN 122 can actually be present. The understood goal of the call center system 100 is to prevent a single point of failure from preventing the uninterrupted operation of the operator console 104 in responding to an incoming call.

In the operation of the call center 102, a call can be offered by the call exchange mechanism 110 to the operator console 104. The acceptance of the call can trigger the logger 112 to record all aspects of the call accepted by the operator console 104. It has been discovered that call center system 100 of the present invention can provide increased availability of the data associated with the operation of the call center system 100.

Figure 2:
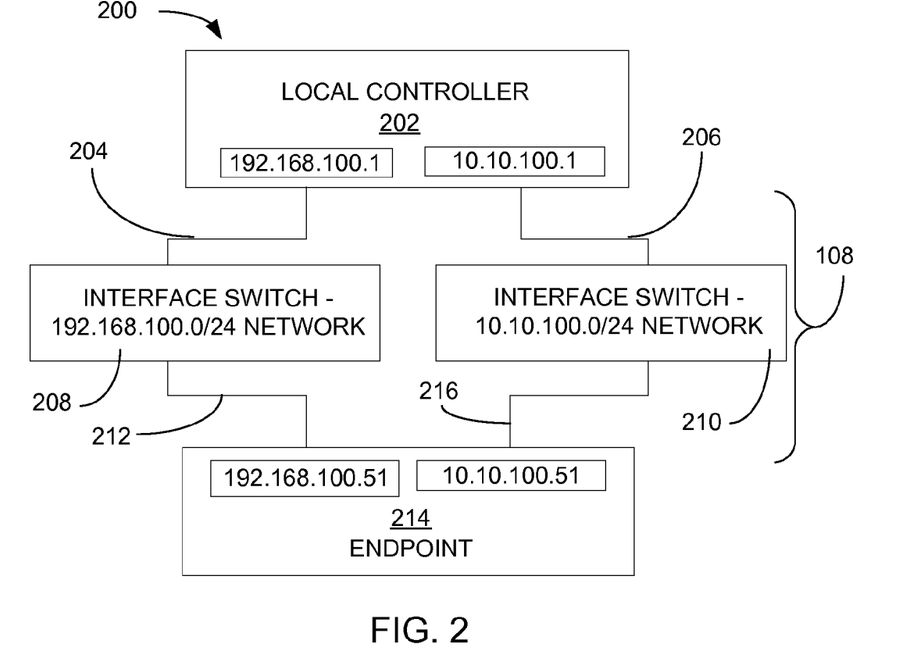
FIG. 2 is a functional block diagram of the network of FIG. 1 with separate network attachments.

Referring now to FIG. 2, therein is shown a functional block diagram of the network of FIG. 1 with separate network attachments 200. The functional block diagram of the network 108 depicts a local controller 202 having a primary interface port 204, such as an Ethernet port with a first address, and a secondary interface port 206, such as an alternate Ethernet port with a second address.

It is understood that the designation of the local controller 202 can be within any of the devices that couple to the network 108 that are capable of communicating with the operator console 104. Further, it is understood that the primary interface port 204 and the secondary interface port 206 can be other than Ethernet ports and while Internet Protocol addresses are shown in the ports, this is by way of example in order to explain the operation of the call center system 100.

The primary interface port 204 can be coupled to a primary interface switch 208. The secondary interface port 206 can be coupled a secondary interface switch 210. The primary interface switch 208 can be coupled to a first interface port 212 of an endpoint 214. The secondary interface switch 210 can be coupled to a second interface port 216 of the endpoint 214.

It is understood that the endpoint 214 can represent the operator console 104 or any of the devices attached to the network 108 that can communicate with the local controller 202. It is further understood that this topology provides two completely independent networks for communicating between the local controller 202 and the endpoint 214. While this technique prevents a single point of failure in the communication between the local controller 202 and the endpoint 214, it requires twice as many units of the interface switch in order to provide this function. Because the network address for each connection is completely different, the OS routing table is configured in a standard way.

As an example, we could use two networks, the 192.168.100.0/24 network as the primary network as represented by the attachment to the primary interface switch 208, and the 10.10.100.0/24 network for the secondary network as represented by the attachment to the secondary interface switch 210. Note that the LSBs of each network address could be made to match to ease address assignment and troubleshooting. It is understood that the combination of the two networks can be considered as the network 108.

Figure 3:
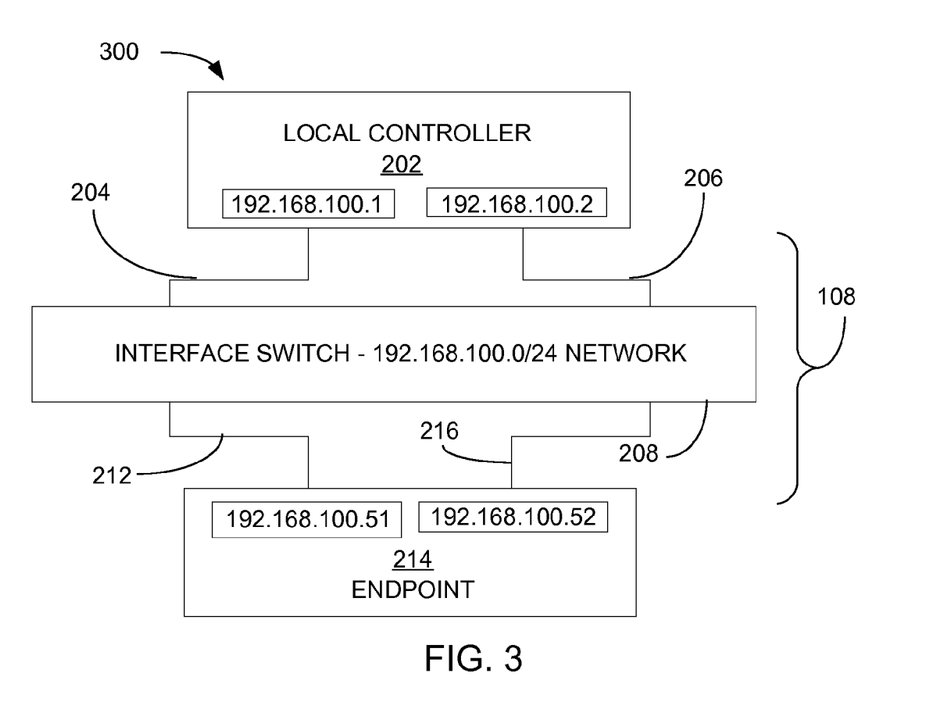
FIG. 3 is a functional block diagram of the network of FIG. 1 with redundant routing in a single network attachment.

Referring now to FIG. 3, therein is shown a functional block diagram of the network 108 of FIG. 1 with redundant routing in a single network attachment 300. The functional block diagram of the network 108 depicts the local controller 202 having the primary interface port 204, such as the Ethernet port with the first address, and the secondary interface port 206, such as the alternate Ethernet port with the second address.

It is understood that the designation of the local controller 202 can be within any of the devices that couple to the network 108. Further, it is understood that the primary interface port 204 and the secondary interface port 206 can be other than Ethernet ports and while Internet Protocol addresses are shown in the ports, this is by way of example in order to explain the operation of the call center system 100.

The primary interface port 204 can be coupled to the primary interface switch 208. The secondary interface port 206 can also be coupled to the primary interface switch 208, but must enter through a separate connector (not shown). The primary interface switch 208 can be coupled to the first interface port 212 of the endpoint 214. The primary interface switch 208 can also be coupled to the second interface port 216 of the endpoint 214.

It is understood that the endpoint 214 can represent the operator console 104, of FIG. 1, or any of the devices attached to the network 108 that can communicate with the local controller 202. It is further understood that this topology provides a single network with multiple paths through the primary interface switch 208 for communicating between the local controller 202 and the endpoint 214. While this technique prevents a single point of failure in the communication between the local controller 202 and the endpoint 214, it requires twice the communication traffic through the interface switch in order to provide this function and there are twice as many addresses as there are devices connected to the network. In a network having a high number of devices coupled to the network, an additional unit of the primary interface switch 208 may be required in order to provide enough connectors to support the network 108. It is understood that by using this approach, the routing table of the local controller 202 will get quite busy. However, utilizing 1160 specific routes of an Ethernet implementation, which supports up to 501 channels and 80 console endpoints, has revealed no noticeable reduction in performance.

Figure 4:
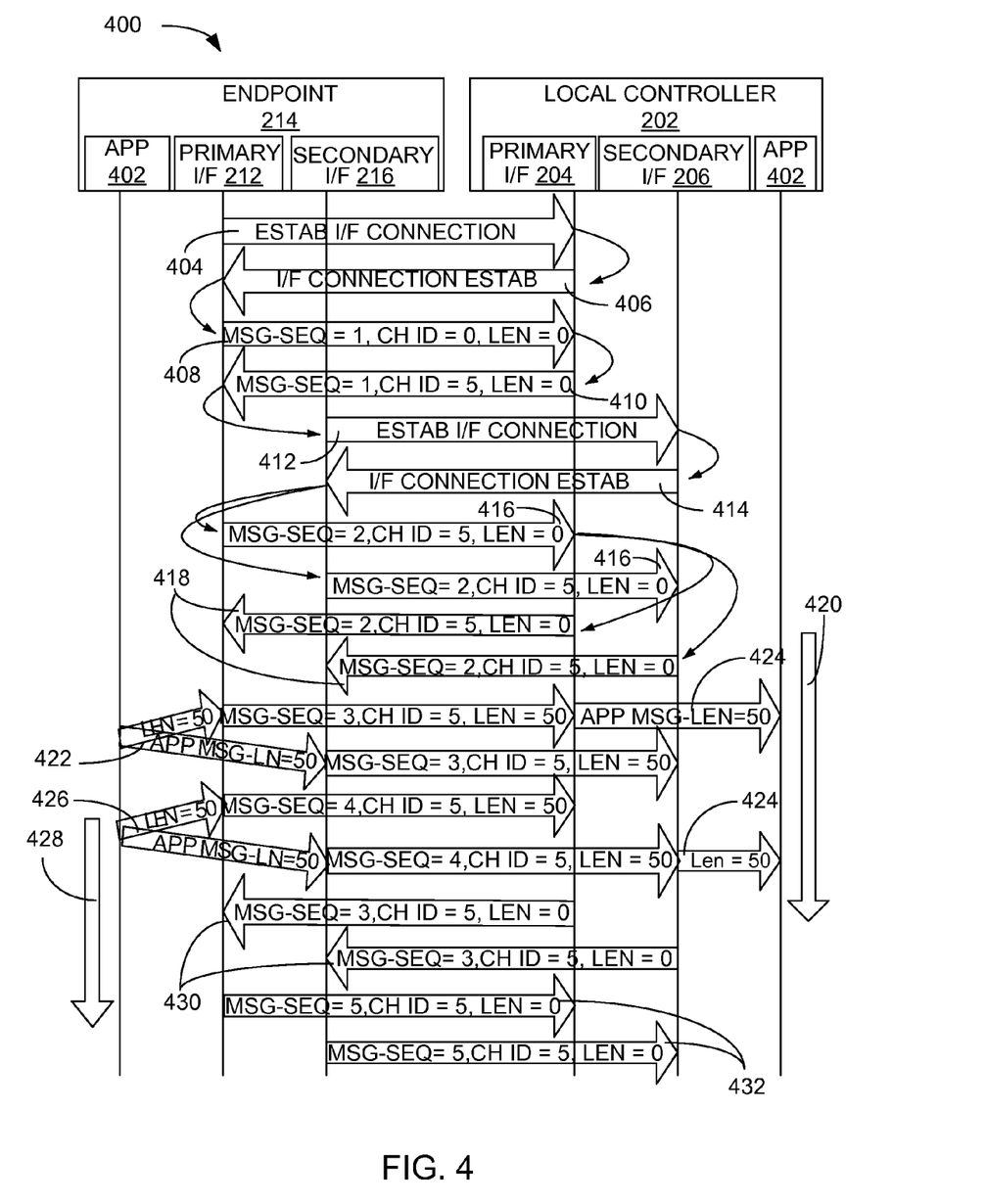
FIG. 4 is a sequence chart of a call center system in an exemplary channel initialization sequence.

Referring now to FIG. 4, therein is shown a sequence chart 400 of a call center system 100 in an exemplary channel initialization sequence. The sequence chart 400 depicts a redundant communication mode exchange between the endpoint 214 and the local controller 202. The sequence chart 400 indicates a progression in time from the top to the bottom and the terminals of the arrows project from the source of the interaction to the destination of the interaction, as indicated by the arrow head. The redundant communication mode exchange between the endpoint 214 and the local controller 202 can utilize multiple transmission protocols, such as the TCP/IP, and can carry multiple application protocols, including vendor proprietary protocols. The multiple carried transmission protocols can be used as management protocols, for channel management, and application transport protocols for accounting and managing application data messages.

In the redundant communication mode any communication generated by an application 402 is transmitted on the first interface port 212 and the second interface port 216. The communication between the endpoint 214 and the local controller 202 is initiated by an establish interface connection message 404 sent from the first interface port 212 of the endpoint 214 to the primary interface port 204 of the local controller 202. A response from the primary interface port 204 of the local controller 202 provides an interface connection established message 406.

A transfer mode message 408 is transmitted by the endpoint 214 on the first interface port 212. The transfer mode message 408 is used to establish the mode of transfer as redundant, which transfers any data messages on both the first interface port 212 and the second interface port 216. A non-redundant mode of transfer only uses the primary interface for data messages.

In response to the transfer mode message 408, the local controller 202 sends a transfer mode acknowledge message 410 specifying the channel ID to be used by the endpoint. In the transfer that is depicted in FIG. 4, the redundant transfer mode is established. In the sequence of operation, the second interface port 216 sends an establish secondary interface connection message 412 to the secondary interface port 206 of the local controller 202. The local controller 202 responds with an interface connection established message 414. The receipt of the interface secondary connection established message 414 causes the endpoint 214 to transmit a transfer mode established message 416 on both the first interface port 212 and the second interface port 216.

A transfer mode accepted message 418 is sent from the local controller 202 on both the primary interface port 204 and the secondary interface port 206. The sending of the transfer mode accepted message 418, and any other message from the local controller 202, will initiate a first protocol delay 420 in the local controller 202. The arrival of the transfer mode accepted message 418 is used to indicate that the initialization is complete, and that the application 402 is now able to generate a first application message 422. As for all transmitted messages, the first application message 422 is transmitted on both the first interface port 212 and the second interface port 216. The sending of the first application message 422, and any other message from the endpoint 214, will initiate a protocol timer 428 in the endpoint 214. The redundant mode of transfer accepts the first message to be received by the destination and disregards the second message to arrive. In the present example the first application message 422 is received by the primary interface port 204 and an application message payload 424 is delivered to the application 402 of the local controller 202.

A subsequent application message 426 can be transmitted by the endpoint 214 at intervals defined by the application 402. The protocol timer 428 will be restarted whenever a new message is sent. A sequence number within the transmission header of the first application message 422 and the subsequent application message 426 can be used by the endpoint 214 and the local controller 202 to determine when a new message has been delivered.

If the first protocol delay 420 in the local controller 202 expires, the local controller 202 will emit a keep alive message 430 in order to keep the link active to the endpoint 214. If the protocol timer 428 in endpoint 214 expires, the endpoint 214 will emit an endpoint keep alive message 432 in order to keep the link to the local controller 202 active.

It is understood that the non-redundant communication mode would utilize the same messaging protocols and accounting techniques but would only be executed on the first interface port 212 and the primary interface port 204. It is further understood that the messaging sequence is an example only and other message exchanges would be required to complete the processing by the application 402 across the first interface port 212 and the second interface port 216.

Figure 5:
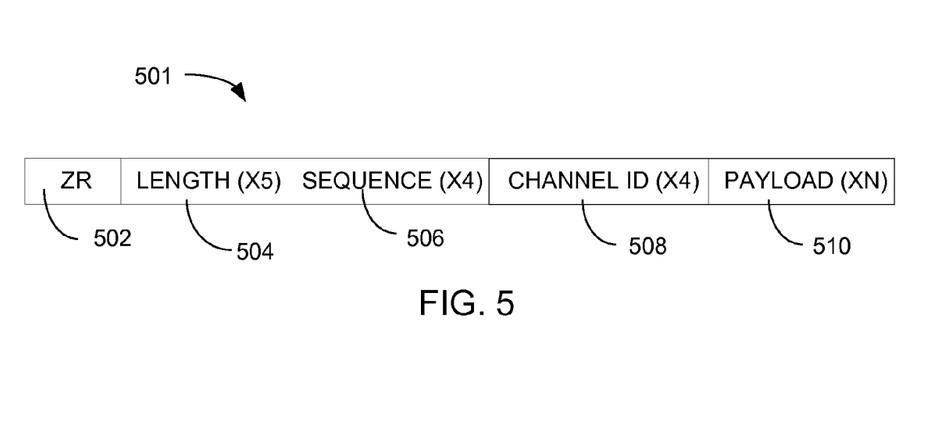
FIG. 5 is a block diagram of a memory segment with a transmission header utilized by the call center system of FIG. 1.

Referring now to FIG. 5, therein is shown a block diagram of a memory segment with a transmission header 501 utilized by the call center system 100 of FIG. 1. The block diagram of the memory segment with the transmission header 501 is defined to include a transfer mode field 502, a length field 504, a message sequence number 506, a channel ID 508, and a payload field 510. The transfer mode field 502 is a two byte ASCII field with the characters "ZR" indicating a redundant communication mode. The redundant communication mode as defined by setting the transfer mode field 502 equal to "ZR" provides a sentinel point for the message.

The length field 504, such as an ASCII field used to represent a hexadecimal value indicating an amount of payload data included in the message. The length field 504 can be five bytes in length for example, in order to indicate a transmission of between zero bytes of payload data and 1,048,575 bytes of payload data. The size of the length field 504 is an example and the number of bytes included in the length field 504 can be different.

The message sequence number 506, such as an ASCII field used to represent the hexadecimal value identifying a message ID indicated by the sequence number. The message sequence number 506 can be four bytes in length for example and have a range of ID's from 1 to 9999 (decimal).

The channel ID 508, such as an identification number implemented as an ASCII field used to represent the hexadecimal value indicating an assigned logical channel number for a connection between the endpoint 214 of FIG. 2, and the local controller 202 of FIG. 2. The channel ID 508 can be four bytes in length for example and have a range of 1 to 65,535 (decimal).

The payload field 510 has the length as indicated in the length field 504. The contents of the payload field 510 can be any data utilized by the application 402 of FIG. 4, but it is suggested that the payload data is recommended to be printable ASCII data.

It is understood that the definitions of the lengths of the fields as defined above can be longer than described in order to accommodate future growth in data transport structures and technologies. It is further understood that the content of the fields is an example implementation and is not intended to limit the content of the individual fields.

Figure 6:
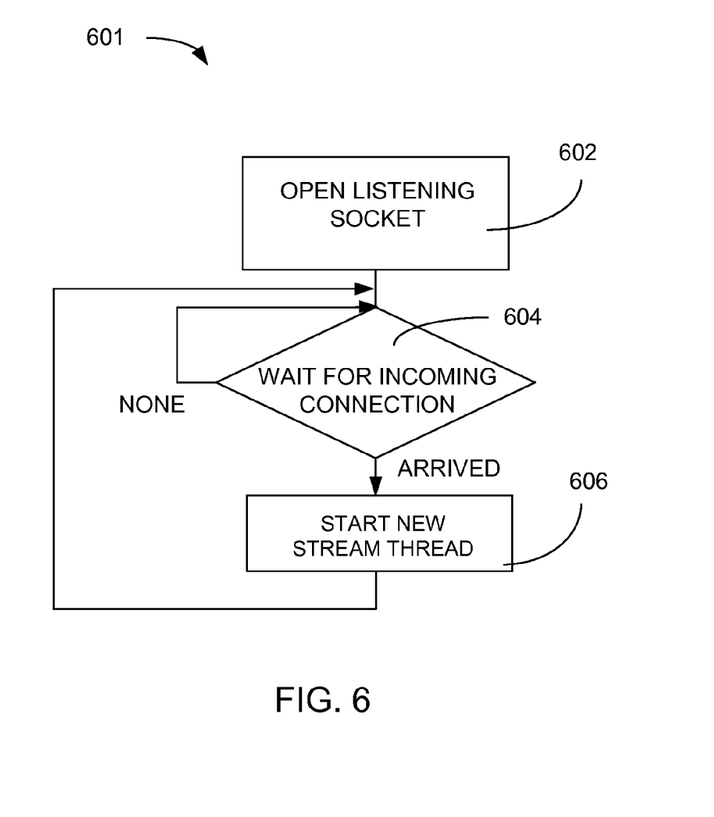
FIG. 6 is a flow chart of an initialization process of a listening port in the local controller of FIG. 2.

Referring now to FIG. 6, therein is shown a flow chart of an initialization process 601 of a listening port in the local controller 202 of FIG. 2. Upon power-up or reset reconfiguration, the local controller 202 can enter an open listening port state 602. This is an essential step in preparing for the communication to the endpoint 214 of FIG. 2, during normal operation. The flow then proceeds to a wait for incoming connection state 604. If no requests for a channel connection are found the flow will loop and return to the wait for incoming connection state 604. When a request is detected the flow proceeds to a start new stream thread state 606 in order to establish an interface connection and assign a logical channel ID and prepare for communication with the requesting unit of the endpoint 214.

Figure 7:
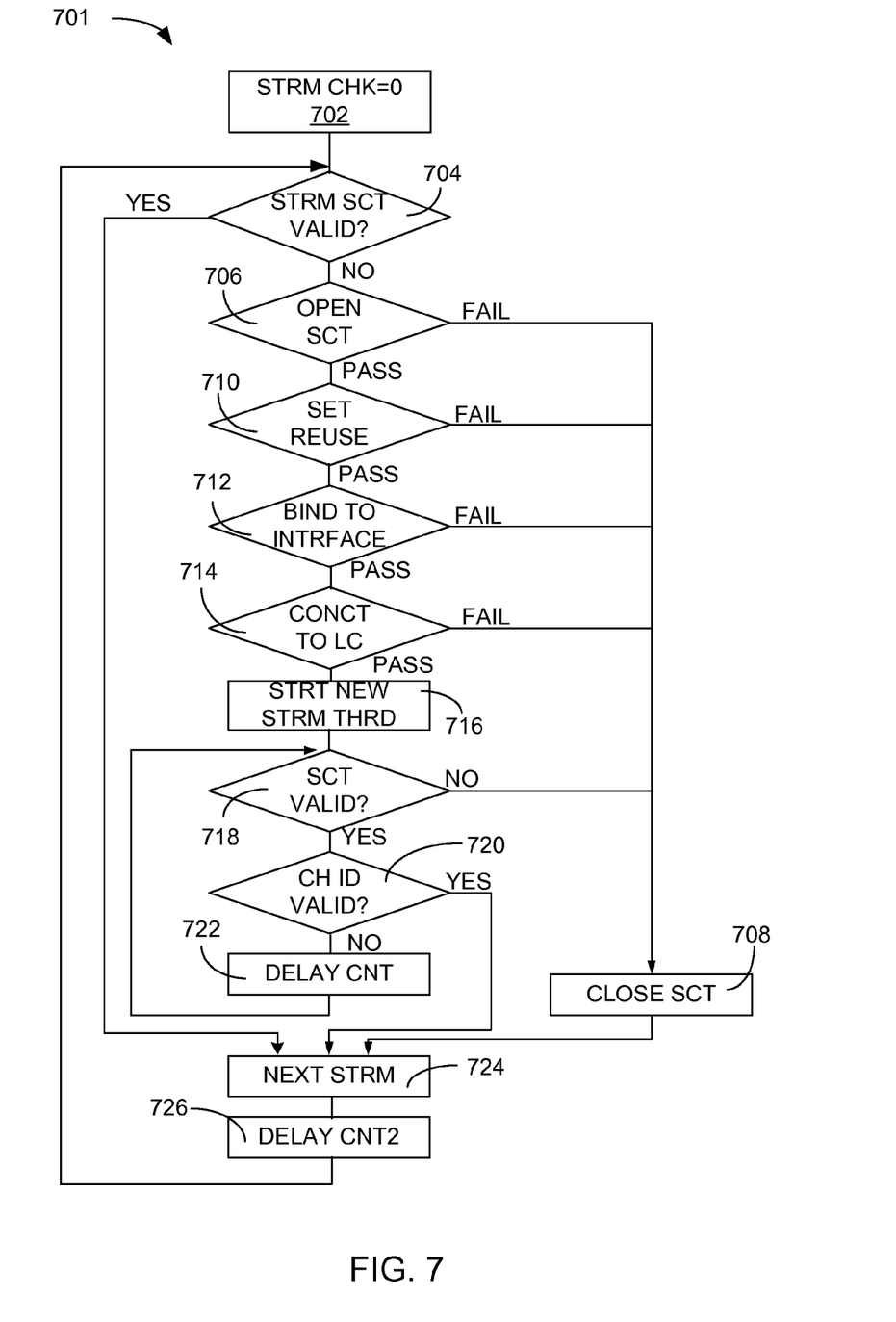
FIG. 7 is a flow chart of the initialization process of the endpoint of FIG. 2.

Referring now to FIG. 7, therein is shown a flow chart of an initialization process 701 of the endpoint 214 of FIG. 2. The flow chart of the initialization process 701 depicts an initialize stream check 702 in which the check count is set to zero and all errors are cleared.

The endpoint 214 can include a comparator circuitry (not shown) for validating the content of a transmission header 501 of FIG. 5. The flow proceeds to a check stream socket valid 704 to determine whether a communication stream is valid. If it is determined that the communication stream is not valid, the flow proceeds to an open communication socket 706 for the purpose of establishing a valid communication link between the endpoint 214 and a designated unit of the local controller 202 of FIG. 2.

If the attempt to open the communication socket fails the flow proceeds to a close socket block 708 in order to clear any errors that might have been set during the attempt to open the socket. If the socket is successfully opened the flow proceeds to a set reuse option block 710, which is used to enable port reuse by the system, after which the flow proceeds to a bind block 712, which is used to attach a new socket to a specific network address. If the attempt to execute the set reuse in block 710 or the bind block 712 fails the flow proceeds to a close socket block 708 in order to clear any errors that might have been set during the attempt to open the socket.

Following a successful completion of the bind block 712, the endpoint 214 attempts to establish a connection with the designated unit of the local controller 202, in a connect to local controller block 714. If the connect to local controller 714 fails the flow proceeds to the close socket block 708 in order to clear any errors that might have been set during the attempt to open the socket.

Following a successful connection by the connect to local controller 714, the endpoint 214 will enter a start new stream thread block 716 to start a new thread with which to run the new connection, after which the flow proceeds to a check socket valid block 718. If the socket is no longer valid the flow proceeds to the close socket block 708 in order to clear any errors that might have been set during the attempt to open the socket.

If the check socket valid block 718 determines that the socket is valid the flow proceeds to a check channel ID valid block 720 to determine if a valid channel identifier has been loaded. If the check channel ID valid block 720 determines that the channel identifier has not been loaded the flow proceeds to a delay count block 722 in to account for the number of attempts to verify the channel ID has been loaded. The flow then returns to the check socket valid block 718 in order to wait for a valid channel ID to be assigned.

Once the check channel ID valid block 720 determines a valid channel ID has been assigned by the local controller 202, flow proceeds to a next stream block 724, in which the endpoint 214 will check the next stream to determine if additional connections are desired. The flow then proceeds to a delay count 2 block 726 in order to provide an appropriate protocol delay between socket connections. The flow then proceeds to the check stream socket valid 704 to initiate processing of the next socket connection. This will continue for the life of the application to ensure that the redundant streams stay connected.

Figure 8:
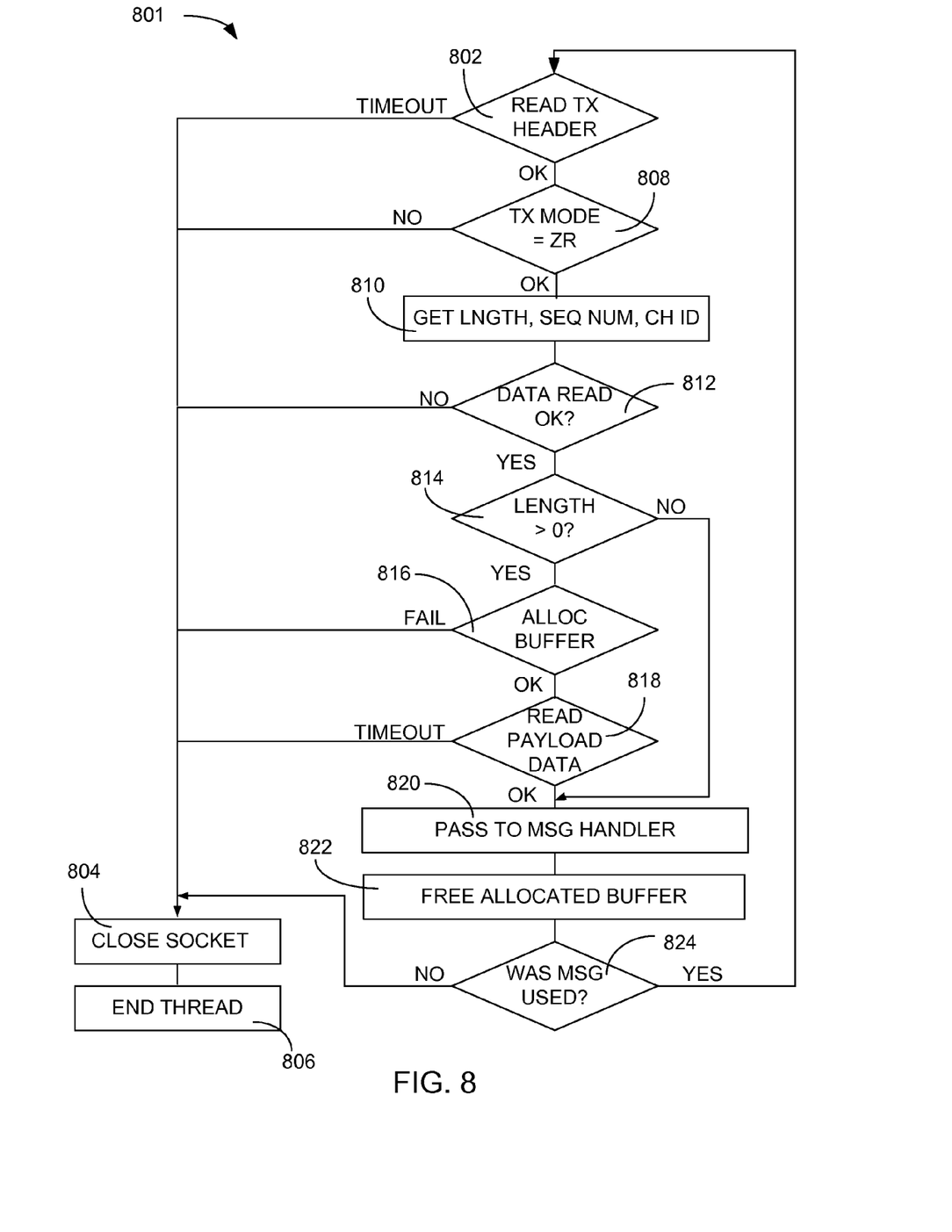
FIG. 8 is a flow chart of a data stream handling process of the call center system of FIG. 1.

Referring now to FIG. 8, therein is shown a flow chart of a data stream handling process 801 of the call center system 100 of FIG. 1. The flow chart of the data stream handling process 801 depicts the process that is created in the start new stream thread block 716, which starts with a read transmission header module 802, which determines whether the transmission header 501 of FIG. 5, was correctly transferred. If the transfer did not complete due to a timeout, the flow proceeds to a close socket module 804 to terminate the transaction and disconnect. The flow then proceeds to an end thread module 806 to initialize the hardware and clear the associated transfer thread.

If the read transmission header module 802 determines that the header was correctly transferred, the flow proceeds to a check for redundant transfer module 808. The check for redundant transfer module 808, examines the transfer mode field 502 of FIG. 5 to determine if the transfer is a redundant transfer mode. The presence of the ASCII characters "ZR" represents a redundant transfer. If the check for redundant transfer module 808 determines that the communication is not a redundant transfer mode, the flow proceeds to the close socket module 804 to terminate the transaction and disconnect. If the check for redundant transfer module 808 determines that the transfer mode field 502 does contain the "ZR", the flow proceeds to an extract information module 810.

The extract information module 810 stores the length of the payload, the message sequence number, and the channel ID for later use. The flow then proceeds to a check data read module 812 to determine whether the data was read correctly. If it is determined that the data was read with errors, the flow proceeds to the close socket module 804 in order to terminate the transaction and disconnect.

If the data was read correctly, the flow proceeds to a check length greater than zero module 814. If the length field 504 of FIG. 5 is equal to zero the flow proceeds to a message handler module 820 for further processing. If however, the length field 504 is greater than zero, a data payload is present and the flow proceeds to an allocate buffer module which will allocate a buffer (not shown) that is large enough to hold the payload data. If the buffer is unable to be allocated, the flow proceeds to the close socket module 804 to terminate the transaction and disconnect. If the buffer is allocated to hold the payload data, the flow proceeds to a read payload data module 818.

The read payload data module 818 checks for a timeout during the data transfer. If no timeout was detected, the flow proceeds to a pass to the message handler module 820. The flow then proceeds to a free allocated buffer module 822. The free allocated buffer module 822 can free the allocated buffer if it is no longer required for other processing. The flow then proceeds to a was message used module 824 to determine whether the delivered message was used. If the delivered message was not used the flow proceeds to the close socket module 804 to terminate the transaction and disconnect. If the delivered message was used the flow proceeds to the read transmission header module 802 to process the next transmission header 501.

Figure 9:
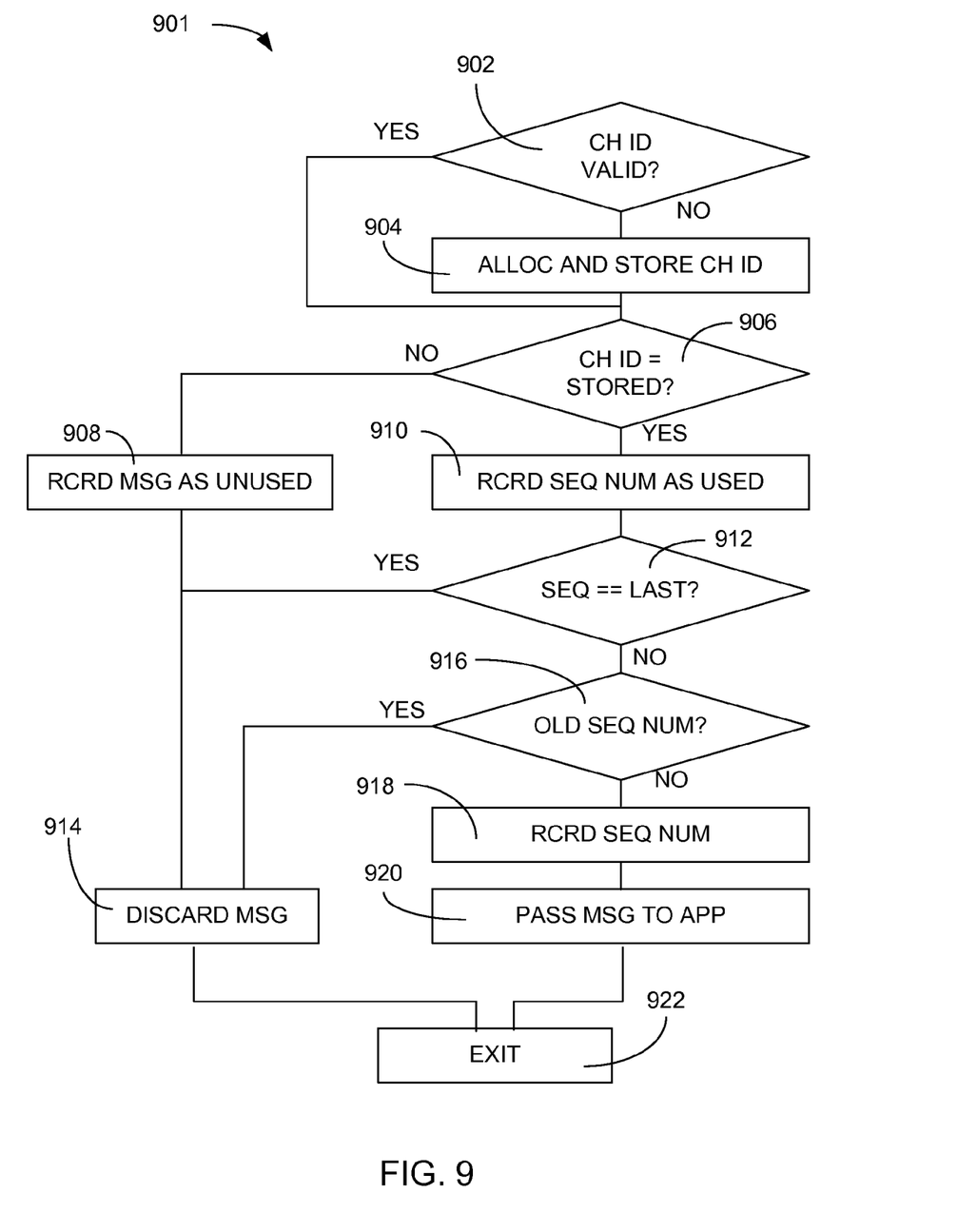
FIG. 9 is a flow chart of a data message handler of the call center system of FIG. 1.

Referring now to FIG. 9, therein is shown a flow chart of a data message handler 901 of the call center system 100 of FIG. 1, representing the process that is executed in block 820 of FIG. 8. The flow chart of the data message handler 901 depicts a channel ID check block 902 for determining whether the channel ID received in the transmission header 501 of FIG. 5, is valid. If the channel ID is determined to be not valid the flow proceeds to an allocate and store channel ID block 904. If the channel ID check block 902 determines that the channel ID is valid, the flow proceeds directly to a channel ID stored block 906.

The channel ID stored block 906 verifies that the channel ID received from the transmission header 501 of FIG. 5, is stored as the selected communication channel. If it is determined that the channel ID is not stored as the channel of interest, the flow proceeds to a record message as unused block 908. The message is marked as unused and the flow proceeds to a discard message block 914 in order to clear the message and proceed to the exit 922.

If the channel ID stored block 906 determines that the channel ID is stored as the channel of interest, the flow proceeds to a record sequence number block 910. The record used sequence number block 910 records the message sequence number 506 as used and the flow proceeds to a check last sequence number block 912. The check last sequence number block 912 verifies whether the message sequence number 506 is the same as the last message received. If the message sequence number 506 is the same as the message sequence number 506 last received it means the message is a duplicate and should be discarded. If the message sequence number 506 is the same as the message sequence number 506 last received, the flow proceeds to the discard message block 914 in order to clear the message and proceed to an exit 922.

If the message sequence number 506 is not the same as the message sequence number 506 last received, the flow proceeds to a check for old sequence number block 916. The check for old sequence number block 916 determines whether the message sequence number 506 has already been used in a previous message exchange. If the check for old sequence number block 916 determines that the message sequence number 506 has already been used, the flow proceeds to the discard message block 914. If the check for old sequence number block 916 determines that the message sequence number 506 has not been used, the flow proceeds to a record sequence number block 918. The flow then proceeds to a pass message to application block 920. The pass message to application block 920 forwards the data from the payload field 510 of FIG. 5, to the application 402 of FIG. 4. The flow then proceeds to the exit 922.

Figure 10:
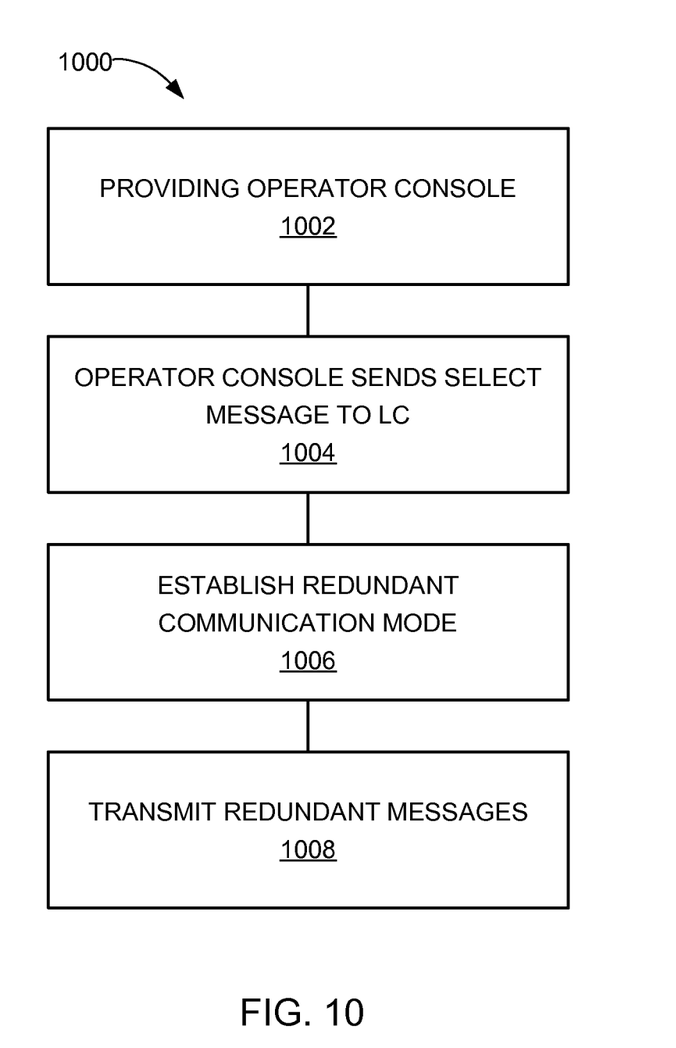
FIG. 10 is a flow chart of a method of operation of the call center system in a further embodiment of the present invention.

Referring now to FIG. 10, therein is shown a flow chart of a method 1000 of operation of the call center system 100 in a further embodiment of the present invention. The method 1000 includes: providing an operator console having a first interface port and a second interface port in a block 1002; communicating with a local controller, having a primary interface port and a secondary interface port, by the operator console in a block 1004; establishing a redundant communication mode between the operator console and the local controller in a block 1006; and transmitting redundant messages between the operator console and the local controller including transmitting transmission headers having identical content on the first interface port and the second interface port in a block 1008.

An example of the operation of the present invention can be described as follows:

To initiate an action such as selecting a channel, the operator (not shown) will select the channel icon on the screen of the operator console 104 of FIG. 1.

The operator console 104 sends a select channel message to the local controller 202 of FIG. 2 using a redundant message over the primary and secondary interfaces.

The local controller 202 receives the redundant message via the primary and secondary interfaces, and uses only the first copy of the redundant message received. The local controller 202 determines that the message is destined for endpoint 214 of FIG. 2, and proceeds to forward the message to endpoint 214 using the redundant message protocol over the primary and secondary interfaces.

The endpoint 214 receives the redundant message via the primary and secondary interfaces, and uses only the first copy of the redundant message received. Endpoint 214 then records the channel as selected, and responds by emitting an updated status message using the redundant message protocol over the primary and secondary interfaces.

The local controller 202 receives the redundant updated status message via the primary and secondary interfaces, and uses only the first copy of the redundant updated status message received. The local controller 202 then passes the redundant updated status message to the operator console 104 using the redundant message protocol over the primary and secondary interfaces.

The operator console 104 receives the redundant updated status message via the primary and secondary interfaces, and uses only the first copy of the redundant updated status message received. The operator console 104 then updates the channel icon on the console screen.

Deselection of the channel by the operator console 104, or any other channel control command will utilize the same procedure as outlined above.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a call center system comprising:
   providing an operator console having a first interface port and a second interface port;
   transmitting a transfer mode message from the first interface port for selecting a redundant mode of transfer;
   communicating with a local controller, having a primary interface port and a secondary interface port, by the operator console;
   establishing a redundant communication mode between the operator console and the local controller includes accepting a first message, to be received from the primary interface port or the secondary interface port, and disregarding a second message to arrive; and
   transmitting redundant messages between the operator console and the local controller including transmitting transmission headers having identical content on the first interface port and the second interface port.

2. The method as claimed in claim 1 further comprising communicating through a network by the operator console including accessing a first network through the first interface port and accessing a second network through the second interface port.

3. The method as claimed in claim 1 wherein transmitting the transmission headers including identifying a message sequence number and a channel identification number in the transmission headers.

4. The method as claimed in claim 1 further comprising:
   communicating through a primary interface switch between the primary interface port and the first interface port; and
   communicating through a secondary interface switch between the secondary interface port and the second interface port.

5. The method as claimed in claim 1 wherein communicating with the local controller having the primary interface port includes accessing an Ethernet port.

6. A method of operation of a call center system comprising:
   providing an operator console having a first interface port and a second interface port;
   transmitting a transfer mode message from the first interface port for selecting a redundant mode of transfer including receiving a transfer mode acknowledge message by the operator console;
   accessing a network through the operator console by the first interface port and the second interface port including transmitting a first application message;
   communicating with a local controller, having a primary interface port and a secondary interface port, through the network by each of the primary interface port and the secondary interface port;
   establishing a redundant communication mode between the operator console and the local controller includes accepting a first message, to be received from the primary interface port or the secondary interface port, and disregarding a second message to arrive; and
   transmitting redundant messages between the operator console and the local controller including transmitting transmission headers having identical content on the first interface port and the second interface port.

7. The method as claimed in claim 6 wherein accessing the network through the operator console including accessing a first network through the first interface port and accessing a second network through the second interface port.

8. The method as claimed in claim 6 wherein transmitting the transmission headers including identifying a message sequence number and a channel ID in the transmission headers.

9. The method as claimed in claim 6 further comprising:
communicating through a primary interface switch between the primary interface port and the first interface port including establishing a channel ID; and
communicating through a secondary interface switch between the secondary interface port and the second interface port including provisioning the channel ID in traffic traversing the secondary interface switch to match corresponding traffic traversing the primary interface switch.

10. The method as claimed in claim 6 wherein communicating with the local controller having the primary interface port includes accessing an Ethernet port for communicating with the first interface port of the operator console.

11. A call center system comprising:
an operator console having a first interface port and a second interface port including a transfer mode message sent from the first interface port for selecting a redundant mode of transfer; and
a local controller, having a primary interface port and a secondary interface port, for establishing a redundant communication mode between the operator console and the local controller includes a first message to be received from the primary interface port or the secondary interface port accepted and a second message to arrive is disregarded.

12. The system as claimed in claim 11 further comprising a network coupled to the operator console for accessing a first network through the first interface port and accessing a second network through the second interface port.

13. The system as claimed in claim 11 further comprising a primary interface switch, coupled to the first interface port, the second interface port, the primary interface port, and the secondary interface port.

14. The system as claimed in claim 11 further comprising:
a primary interface switch between the primary interface port and the first interface port; and
a secondary interface switch between the secondary interface port and the second interface port.

15. The system as claimed in claim 11 wherein the local controller, having the primary interface port includes the local controller having an Ethernet port.

16. The system as claimed in claim 11 further comprising:
a network coupled to the operator console by the first interface port and the second interface port; and
a local router coupled to the operator console by the network for accessing a wide area network by the redundant communication mode.

17. The system as claimed in claim 16 wherein the network coupled to the operator console includes a first network coupled through the first interface port and a second network coupled through the second interface port.

18. The system as claimed in claim 16 further comprising a comparator in the operator console for validating a message sequence number and a channel ID.

19. The system as claimed in claim 16 further comprising a primary interface switch coupled to the first interface port, the second interface port, the primary interface port, and the secondary interface port includes a routing table in the operator console and the local controller.

20. The system as claimed in claim 16 wherein the local controller, having the primary interface port and the secondary interface port includes the local controller having an primary Ethernet port and an alternate Ethernet port.

* * * * *